(12) United States Patent
Watanabe (10) Patent No.: US 9,150,203 B2
(45) Date of Patent: Oct. 6, 2015

(54) VEHICLE BRAKING CONTROL DEVICE

(75) Inventor: Yoshinori Watanabe, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/352,911

(22) PCT Filed: Oct. 20, 2011

(86) PCT No.: PCT/JP2011/074209
§ 371 (c)(1),
(2), (4) Date: Apr. 18, 2014

(87) PCT Pub. No.: WO2013/057823
PCT Pub. Date: Apr. 25, 2013

(65) Prior Publication Data
US 2014/0244128 A1     Aug. 28, 2014

(51) Int. Cl.
*B60T 7/12* (2006.01)
*B60T 8/1761* (2006.01)
*B60T 8/1755* (2006.01)

(52) U.S. Cl.
CPC ............. *B60T 8/1761* (2013.01); *B60T 8/1755* (2013.01); *B60T 2270/304* (2013.01)

(58) Field of Classification Search
USPC .......................................................... 701/74
See application file for complete search history.

(56) References Cited

U.S. PATENT DOCUMENTS

| | | | |
|---|---|---|---|
| 5,967,629 A | 10/1999 | Kubota | |
| 6,082,834 A * | 7/2000 | Kolbe et al. | 303/139 |
| 6,505,110 B1 * | 1/2003 | Yoshino | 701/71 |
| 6,629,026 B1 * | 9/2003 | Baraszu et al. | 701/22 |
| 7,841,674 B2 * | 11/2010 | Goebels et al. | 303/163 |
| 2003/0183431 A1 * | 10/2003 | Cikanek et al. | 180/65.6 |
| 2004/0124701 A1 * | 7/2004 | Nihei et al. | 303/163 |
| 2006/0004509 A1 * | 1/2006 | Teslak et al. | 701/84 |
| 2008/0116743 A1 * | 5/2008 | Jeon et al. | 303/152 |
| 2008/0177434 A1 * | 7/2008 | Moran | 701/22 |
| 2009/0115247 A1 * | 5/2009 | Leiber et al. | 303/154 |

FOREIGN PATENT DOCUMENTS

| | | |
|---|---|---|
| JP | 3 42361 | 2/1991 |
| JP | 7 304437 | 11/1995 |
| JP | 9 290735 | 11/1997 |

OTHER PUBLICATIONS

International Search Report Issued Dec. 20, 2011 in PCT/JP11/074209 Filed Oct. 20, 2011.

* cited by examiner

*Primary Examiner* — Hussein A. Elchanti
(74) *Attorney, Agent, or Firm* — Oblon, McCelland, Maier & Neustadt, L.L.P.

(57) ABSTRACT

A vehicle braking control device includes a braking force simultaneous control mode executing unit capable of executing a braking force simultaneous control mode for simultaneously controlling right/left wheels cylinders by a brake hydraulic pressure circuit according to slip ratios of right/left wheels, a braking force independent control mode executing unit capable of executing a braking force independent control mode for independently controlling the right/left wheels cylinders, and a switching controller capable of switching the braking force simultaneous control mode and the braking force independent control mode, wherein the switching controller switches to the braking force independent control mode at the time a slip ratio difference of the right/left rear wheels becomes equal to or less than a preset and predetermined value during switching from the braking force simultaneous control mode to the braking force independent control mode.

14 Claims, 9 Drawing Sheets

VEHICLE BRAKING CONTROL DEVICE

FIELD

The present invention relates to a vehicle braking control device.

BACKGROUND

Antilock brake devices (ABS) are available as an device that suppresses idle running due to locked wheels by detecting that the wheels are locked or slipped when a vehicle is braked and executing a control for automatically loosening a brake. The antilock brake device is applied with a system for simultaneously controlling right and left braking forces to rear wheels and a system that independently controls the right and left braking forces to the rear wheels, and the systems can be switched. For example, an antiskid controller described in Patent Literature 1 described below selectively uses a select low control, an independent limiting control, and an independent control according to a travel state of a vehicle.

CITATION LIST

Patent Literature

Patent Literature 1: Japanese Patent Application Laid-open No. 3-042361

SUMMARY

Technical Problem

The conventional antiskid brake controller described above selectively switches the select low control, the independent limiting control, and the independent control according to a vehicle speed. However, at the time of switching, since braking forces are increased and decreased until a difference between braking forces of right/left wheels (rear wheels) reaches a target value, there is a fear that a disturbance of behavior of the vehicle occurs and a traveling stability is deteriorated.

A purpose of the present invention, which is made in view of the circumstances, is to provide a vehicle braking control device capable of improving a travelling stability of a vehicle when a braking control is switched.

Solution to Problem

A vehicle braking control device according to the present invention includes right/left actuators configured to apply braking forces to right/left wheels; a braking force simultaneous control mode executing unit capable of executing a braking force simultaneous control mode for simultaneously controlling the right/left actuators according to states of the right/left wheels; a braking force independent control mode executing unit capable of executing a braking force independent control mode for independently controlling the right/left actuators according to states of the right/left wheels; and a switching controller capable of switching the braking force simultaneous control mode and the braking force independent control mode, wherein at the time a right/left wheel slip ratio difference becomes equal to or less than a preset and predetermined slip ratio difference during switching from the braking force simultaneous control mode to the braking force independent control mode, the switching controller shifts to the braking force independent control mode.

In the vehicle braking control device, it is preferable that at the time the right/left wheel slip ratio difference is larger than the preset and predetermined slip ratio difference, the switching controller increases a braking force of a wheel on a slip ratio small side, whereas decreasing a braking force of a wheel on a slip ratio large side.

In the vehicle braking control device, it is preferable that the switching controller increases the braking force of the wheel on the slip ratio small side, whereas decreasing the braking force of the wheel on the slip ratio large side without changing any of all the braking forces of the right/left wheels.

In the vehicle braking control device, it is preferable that at the time the right/left wheel slip ratio difference is larger than the preset and predetermined slip ratio difference, the switching controller increases the braking force of the wheel on the slip ratio small side, whereas keeping the braking force of the wheel on the slip ratio large side.

In the vehicle braking control device, it is preferable that at the time a transverse momentum of a vehicle is equal to or more than a preset and predetermined transverse momentum, the switching controller switches to the braking force independent control mode without executing a determination of the right/left wheel slip ratio difference.

In the vehicle braking control device, it is preferable that at the time a speed of the vehicle becomes equal to or less than a preset and predetermined speed, the switching controller switches from the braking force simultaneous control mode to the braking force independent control mode.

A vehicle braking control device according to the present invention includes right/left actuators configured to apply braking forces to right/left wheels; a right/left equal braking force control mode executing unit capable of executing a right/left equal braking force control mode for controlling the right/left actuators so that braking forces of the right/left wheels becomes the same braking force; a right/left equal slip ratio control mode executing unit capable of executing a right/left equal slip ratio control mode for controlling the right/left actuators so that slip ratios of the right/left wheels become the same slip ratio; and a switching controller capable of switching the right/left equal braking force control mode and the right/left equal slip ratio control mode, wherein at the time a right/left wheel slip ratio difference becomes equal to or less than a preset and predetermined slip ratio difference during switching from the right/left equal braking force control mode to the right/left equal slip ratio control mode, the switching controller shifts to the right/left equal slip ratio control mode.

Advantageous Effects of Invention

The vehicle braking control device according to the present invention can execute the braking force simultaneous control mode for controlling the right/left actuators simultaneously that apply the braking forces to the right/left wheels and can execute the braking force independent control mode for independently controlling the right/left actuators so that, when the braking force simultaneous control mode is switched to the braking force independent control mode, the braking control device shifts to the braking force independent control mode when the right/left wheel slip ratio difference becomes the preset and predetermined value. Thus, there is achieved an effect that a traveling stability can be improved by suppressing an occurrence of a disturbance of behavior of the vehicle when the modes are switched.

DESCRIPTION OF EMBODIMENTS

Embodiments of a vehicle braking control device according to the present invention will be explained below in detail based on the drawings. The present invention is not restricted by the embodiments and further when plural embodiments exist, the embodiments include also present inventions configured by combining respective embodiments.

First Embodiment

Figure 1:
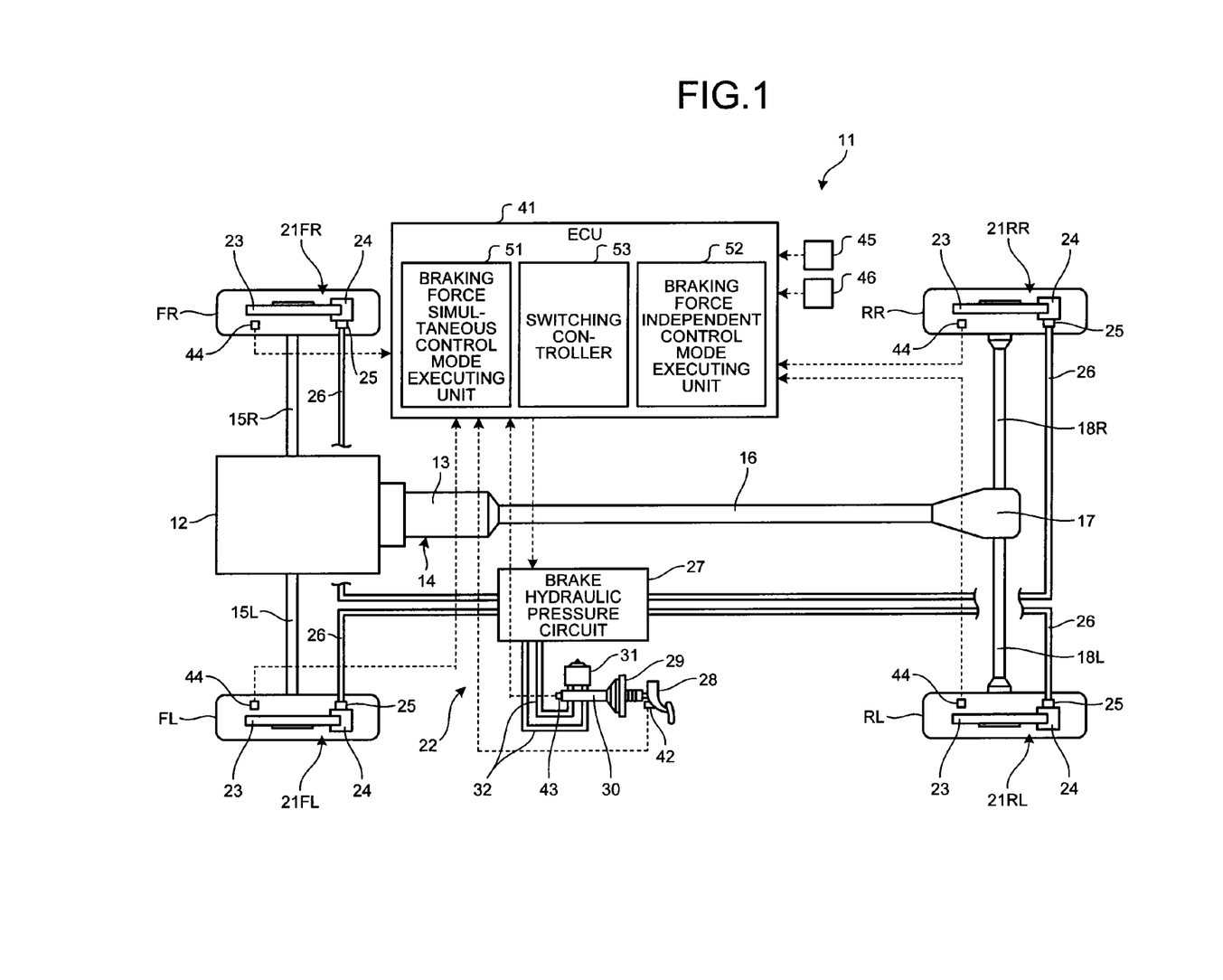
FIG. 1 is a schematic configuration view illustrating a vehicle braking control device according to a first embodiment of the present invention.
Figure 2:
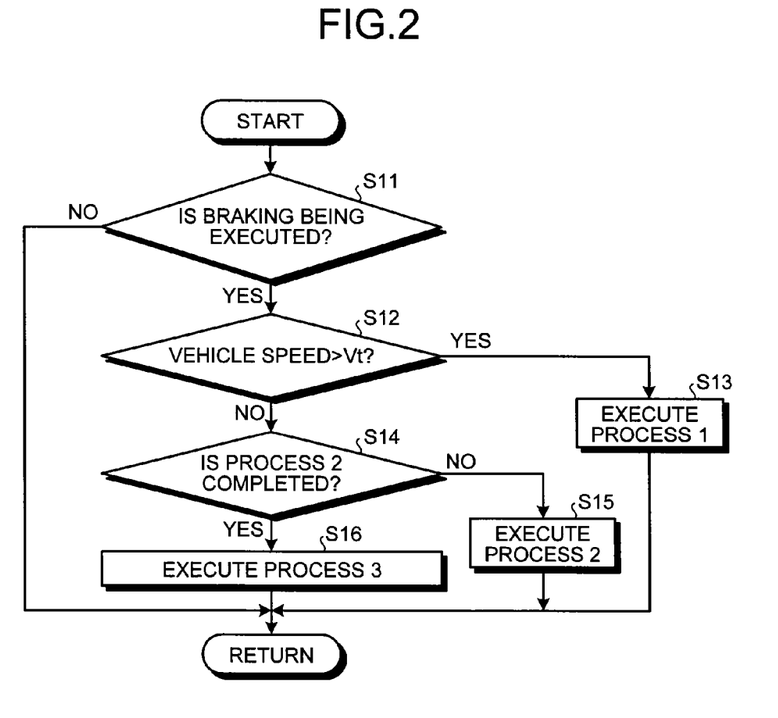
FIG. 2 is a flowchart illustrating a mode switching process of a braking control in the vehicle braking control device of the first embodiment.
Figure 3:
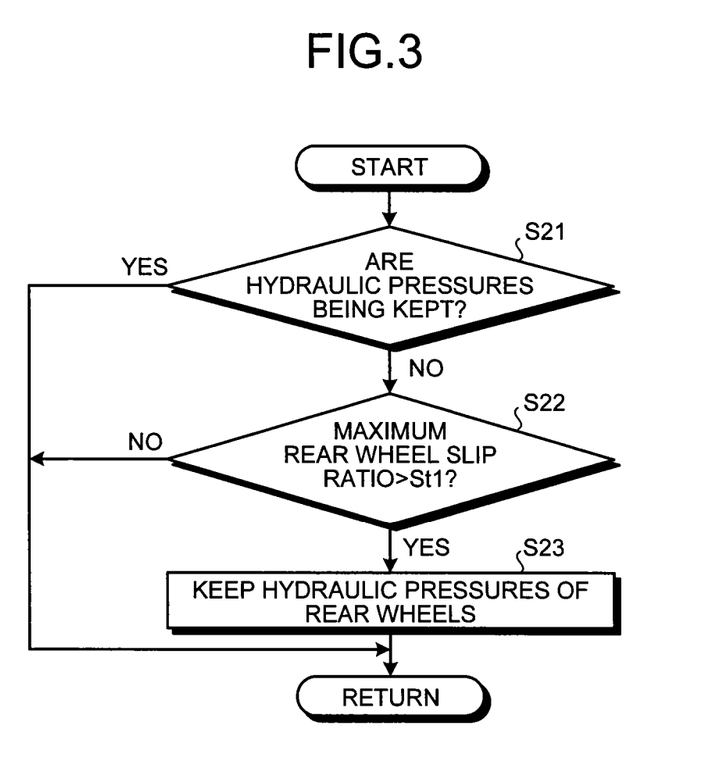
FIG. 3 is a flowchart illustrating a braking process 1 by the vehicle braking control device of the embodiment.
Figure 4:
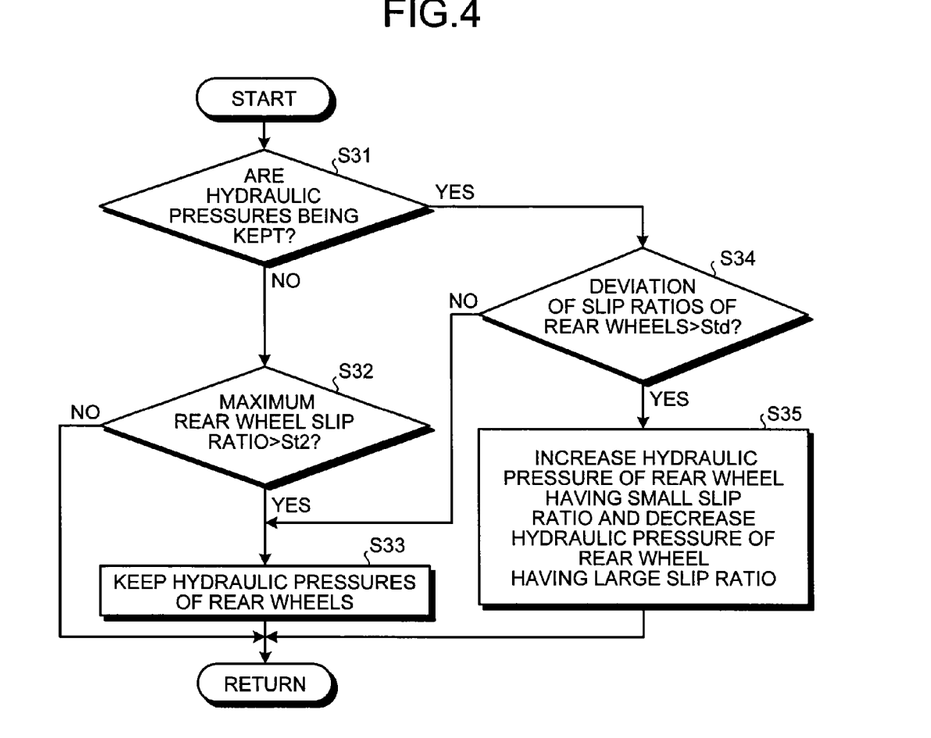
FIG. 4 is a flowchart illustrating a braking process 2 by a vehicle braking control device of a first embodiment.
Figure 5:
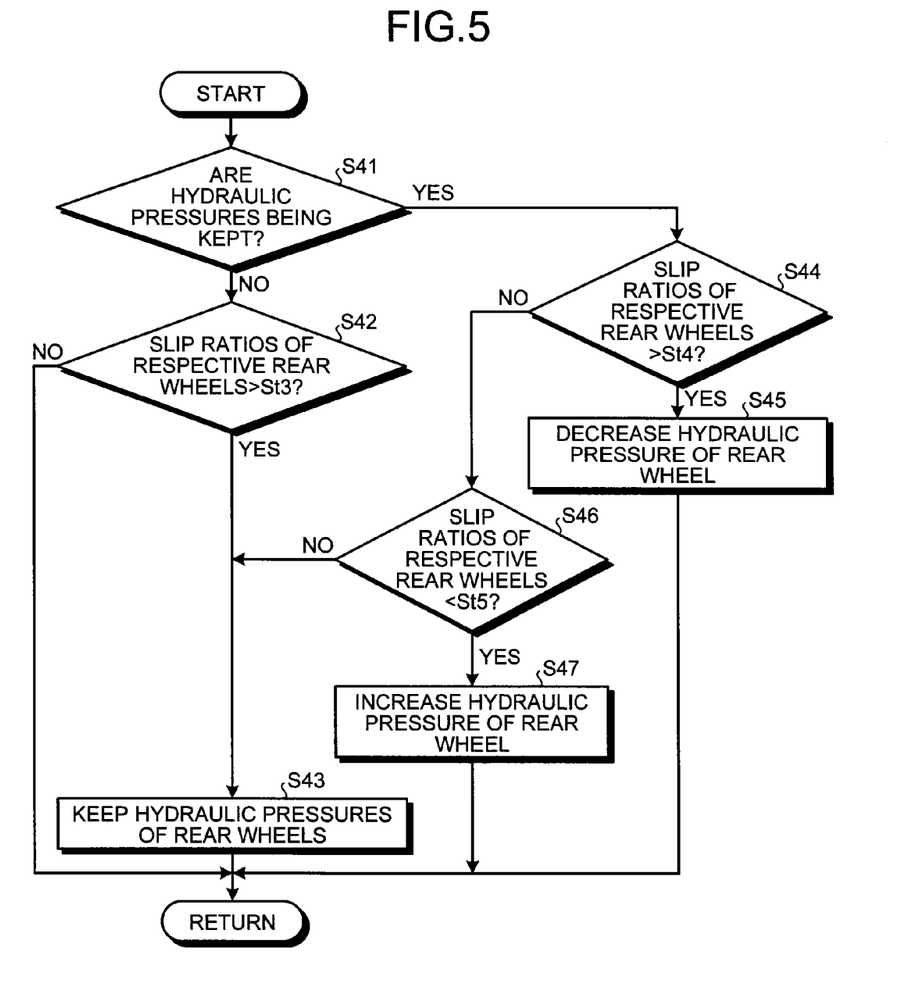
FIG. 5 is a time chart illustrating a braking process 3 by the vehicle braking control device of the first embodiment.
Figure 6:
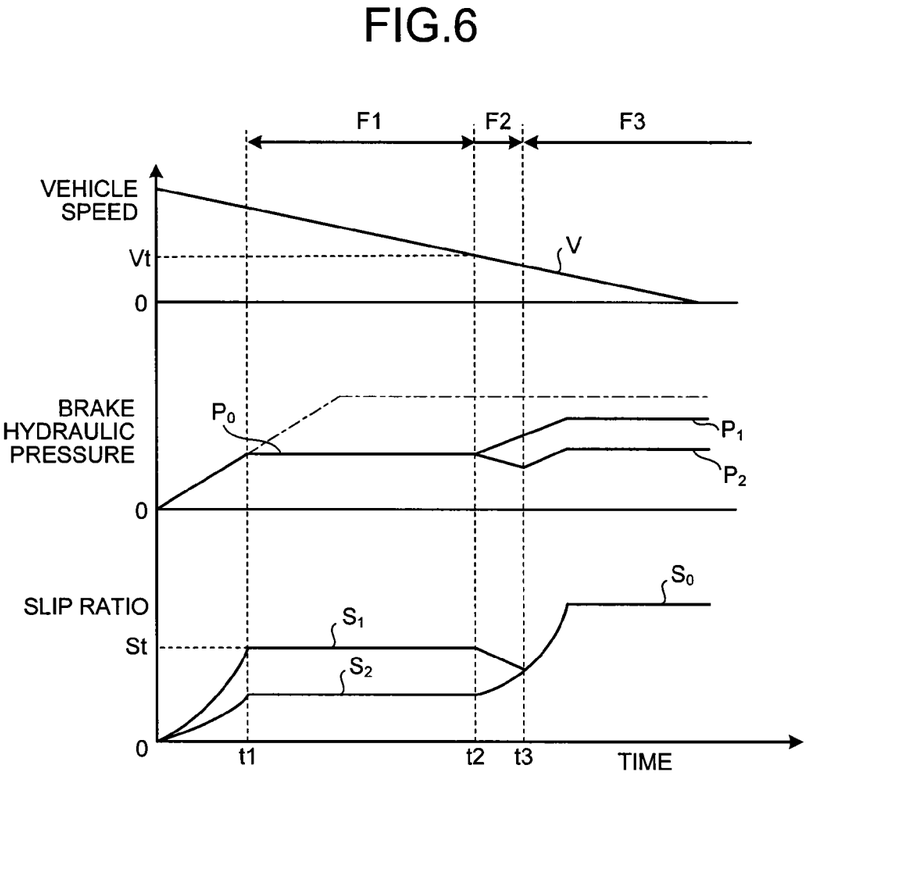
FIG. 6 is a time chart illustrating a switching process of the braking control in the vehicle braking control device of the first embodiment.

FIG. 1 is a schematic configuration view illustrating a vehicle braking control device according to a first embodiment of the present invention, FIG. 2 is a flowchart illustrating a mode switching process of a braking control in the vehicle braking control device of the first embodiment, FIG. 3 is a flowchart illustrating a braking process 1 by the vehicle braking control device of the embodiment, FIG. 4 is a flowchart illustrating a braking process 2 by a vehicle braking control device of a first embodiment, FIG. 5 is a time chart illustrating a braking process 3 by the vehicle braking control device of the first embodiment, and FIG. 6 is a time chart illustrating a switching process of the braking control in the vehicle braking control device of the first embodiment.

A brake device controlled by the vehicle braking control device of the first embodiment is an electronic control type brake device that electrically controls braking forces of a vehicle, i.e. hydraulic pressures supplied to wheel cylinders that generate the braking forces to a brake operation amount (or a brake operation force, and the like) input from a brake pedal. Specifically, the electronic control type brake device is an Electronically Controlled Brake (ECB) that sets a target brake hydraulic pressure according to the brake operation amount and controlling the braking forces by supplying a hydraulic pressure accumulated in an accumulator to the wheel cylinders after the hydraulic pressure is adjusted. However, even a braking control system of a type, in which a master cylinder pressure generated by a brake pedal operation of a driver is directly introduced to wheel cylinders, may be used, as the braking control device as long as braking control system can control braking forces of wheels independently of the brake pedal operation of the driver.

Further, the vehicle braking control device of the embodiment includes an automatic braking control device (a first braking control device) that operates the brake device based on peripheral information of the vehicle, and an antilock brake device (a second braking control device) that operates the brake device so that the wheels are suppressed from being slipped.

The vehicle braking control device of the embodiment will be explained below in detail. As illustrated in FIG. 1, a vehicle 11 includes four wheels FL, FR, RL, RR that can be driven. When viewed from a driver's seat, the wheel FR illustrates a front right wheel, the wheel FL illustrates a front left wheel, the wheel RR illustrates a rear right wheel, and the wheel RL illustrates a rear left wheel, respectively. Further, the vehicle 11 includes an internal combustion engine 12 that is a gasoline engine or a diesel engine, a transaxle 14 including a transmission 13 that is an automatic transmission or a continuously variable transmission, and a not illustrated transfer.

Namely, the vehicle 11 of the embodiment is configured as a four-wheel-drive vehicle and transmitted with power from the internal combustion engine 12 via the front wheels FL, FR, the transfer, a not illustrated front differential, and drive shafts 15L, 15R. Further, an output shaft 16 of the transaxle 14 is connected to a rear differential 17, and the rear differential 17 is connected to the rear wheels RL, RR via drive shafts 18L, 18R. Thus, in the vehicle 11, the power is transmitted to the rear wheels RL, RR from the internal combustion engine 12 via the output shaft 16, the rear differential 17, and the drive shafts 18L, 18R.

The vehicle 11 of the embodiment is not restricted to the four-wheel-drive vehicle and may be a two-wheel-drive vehicle and further an electric vehicle mounted with an electric motor in place of an internal combustion engine and may be a hybrid vehicle mounted with an internal combustion engine and an electric motor.

Further, the vehicle 11 includes a brake device 22 including disk brake units (actuators) 21FR, 21FL, 21RR, 21RL disposed to the respective wheels FR-RL. The brake device 22 is configured as a so-called an Antilock Brake System: an Antilock Brake Device (ABS) provided with an Electronic Braking force Distribution Control (EBD). Each of the disk brake units 21FR-21RL includes a brake disk 23 and a brake caliper 24, and each brake caliper 24 includes a wheel cylinder 25. The wheel cylinders 25 of the respective brake calipers 24 are connected to a brake hydraulic pressure circuit 27 having brake actuators via independent liquid pressure lines 26, respectively.

A brake pedal 28 is supported so that a driver can depress it and is connected with a brake booster 29, and a master cylinder 30 is fixed to the brake booster 29. The brake booster 29 can generate an assist force having a predetermined boost ratio in response to a depression operation of the driver to the brake pedal 28. The master cylinder 30 includes two hydraulic pressure chambers formed by movably supporting a not illustrated piston therein and can generate a master cylinder pressure, which is created by combining a brake depression force with an assist force, in each hydraulic pressure chamber. A reservoir tank 31 is disposed above the master cylinder 30, the master cylinder 30 communicates with the reservoir tank 31 in a state that the brake pedal 28 is not depressed, and when the brake pedal 28 is depressed, they are closed so that the hydraulic pressure chambers of the master cylinder 30 are pressurized. In the master cylinder 30, the respective hydraulic pressure chambers are connected to the brake hydraulic pressure circuit 27 via hydraulic pressure supply paths 32, respectively.

The brake hydraulic pressure circuit 27 creates brake hydraulic pressures according to a depression amount of the brake pedal 28 by the driver, supplies the brake hydraulic pressures from the respective liquid pressure lines 26 to the wheel cylinders 25, and operates the respective wheel cylinders 25 so that braking forces can be applied to the wheels FR-RL by the brake device 22 and can be caused to act on the vehicle 11.

The vehicle 11 is mounted with an electronic control unit (ECU) 41 which is configured as a microprocessor mainly composed of a CPU and includes a ROM that stores a processing program, a RAM that temporarily stores data, an input/output port, and a communication port in addition to the CPU. The ECU 41 can control the internal combustion engine 12, the transmission 13, the brake hydraulic pressure circuit 27, and the like.

The ECU 41 is connected with a brake stroke sensor 42 that detects the depression amount (a brake pedal stroke) of the brake pedal 28 and a master cylinder pressure sensor 43 that detects the hydraulic pressure (the master cylinder pressure) supplied from the master cylinder 30. The ECU 41 controls the brake hydraulic pressures created by the brake hydraulic pressure circuit 27 based on the detected brake pedal stroke, the master cylinder pressure, and the like. A brake depression force sensor that detects a depression force of the brake pedal 28 may be used in place of the brake stroke sensor 42.

The ECU 41 can control the brake device 22 configured as the ABS. Namely, the ECU 41 can adjust the hydraulic pressures supplied to the respective disk brake units 21FR-21RL, i.e. to the respective wheel cylinders 25 by the brake hydraulic pressure circuit 27. Specifically, the ECU 41 controls the operation of brake device 22 (the brake hydraulic pressure circuit 27) so as to suppress slip ratios of the wheels FR-RL. The ECU 41 is connected with wheel speed sensors 44 and a vehicle speed sensor 45. The wheel speed sensors 44 are attached to the respective wheels FR-RL, detect rotation speeds thereof, and transmit detected rotation speeds (wheel speeds) of the respective wheels FR-RL to the ECU 41. The vehicle speed sensor 45 detects a speed of a vehicle body and transmits a detected vehicle body speed (a vehicle speed) to the ECU 41.

The ECU 41 calculates the slip ratios $\Delta S$ of the wheels FR-RL based on the wheel speeds $V_W$ detected by the wheel speed sensors 44 and the vehicle speed V detected by the vehicle speed sensor 45 and controls the brake hydraulic pressures created by the brake hydraulic pressure circuit 27 based on the slip ratios $\Delta S$. For example, the slip ratios $\Delta S$ are calculated by the following expression.

$$\Delta S = [(V - V_W)/V] \times 100$$

Since the wheel speed sensors 44 are disposed corresponding to the wheels FR-RL, when the wheel speeds $V_W$ are determined, it is sufficient to determine the slip ratios $\Delta S$ by averaging the four values detected by the respective wheel speed sensors 44 and using the average value as the wheel speeds $V_W$. Further, a calculation method of the slip ratios $\Delta S$ is not restricted to the method according to the expression and, for example, a deviation between the vehicle speed V and the wheel speeds $V_W$ may be used as the slip ratios $\Delta S$, a deviation between a detection value of an acceleration sensor 46 and differential values of the wheel speeds $V_W$ may be used as the slip ratios $\Delta S$, and further the vehicle speed V may be estimated from an output of the internal combustion engine 12 and a gear shift ratio of the transmission 13.

The ECU 41 is set with a threshold value for starting a control of the brake hydraulic pressure circuit 27, and when the slip ratios $\Delta S$ of the wheels FR-RL at the current time become larger than a threshold value of a preset slip ratio, the ECU 41 starts the control of the brake hydraulic pressure circuit 27. With the operation, the ECU 41 controls the operation of the brake device 22 (the brake hydraulic pressure circuit 27) so that the slip ratios of the wheels FR-RL are suppressed, i.e. so that a lock (or a slip) of the wheels FR-RL is suppressed.

The ECU 41 includes a braking force simultaneous control mode executing unit (a right/left equal braking force control mode executing unit) 51 capable of executing a braking force simultaneous control mode (a right/left equal braking force control mode) for simultaneously controlling the right/left disk brake units (actuators) 21FR, 21FL, 21RR, 21RL so that right/left braking forces become the same braking force according to states of the right/left wheels FR-RL, a braking force independent control mode executing unit (a right/left equal slip ratio control mode executing unit) 52 capable of executing a braking force independent control mode (a right/left equal slip ratio control mode) for independently controlling the right/left disk brake units (actuators) 21FR, 21FL, 21RR, 21RL so that right/left slip ratios become the same slip ratio according to the states of the right/left wheels FR-RL, and a switching controller 53 capable of switching the braking force simultaneous control mode (the right/left equal braking force control mode executing unit) and the braking force independent control mode (the right/left equal slip ratio control mode).

In the case, the respective mode executing units 51, 52 can simultaneously or independently control the right/left front wheels FL, FR and further can simultaneously or independently controls the right/left rear wheels RL, RR. The switching controller 53 can switch the modes to the right/left front wheels FL, FR and to the right/left rear wheels RL, RR.

Although the ECU 41 selects the braking force simultaneous control mode or the braking force independent control mode according to a travel state of the vehicle 11, in general, when the vehicle 11 travels at a high speed, the ECU 41 selects the braking force simultaneous control mode, whereas when the vehicle 11 travels at a medium/low speed, the ECU 41 selects the braking force independent control mode. Namely, the ECU 41 controls the operation of the brake device 22 according to the depression amount of the brake pedal 28 of the driver, and when a speed of the vehicle 11 is decreased, the ECU 41 switches from the braking force simultaneous control mode to the braking force independent control mode. When the modes are switched, since a braking force increases and decreases during a period in which a braking force difference of the right/left wheels FR-RL, in particular, a braking force difference of the right/left rear wheels RL, RR reaches a target value, there is a fear that a disturbance of behavior of the vehicle 11 occurs and a traveling stability is deteriorated.

Thus, in the vehicle braking control device of the first embodiment, when the slip ratio difference of the right/left rear wheels RL, RR becomes equal to or less than a preset and predetermined value at the time of switching from the braking force simultaneous control mode to the braking force independent control mode, the ECU 41 (the switching controller 53) shifts to the braking force independent control mode.

At the time, when the slip ratio difference of the right/left rear wheels RL, RR is larger than the preset and predetermined value, the ECU 41 (the switching controller 53) increases a braking force of a rear wheel on a slip ratio small side, whereas decreasing a braking force of a rear wheel on a slip ratio large side without changing any of all the braking forces of the right/left rear wheels RL, RR.

When the vehicle 11 travels at the high speed, the vehicle braking control device of the first embodiment executes a control so that the braking forces become smaller than braking forces at the time of the medium/low speed travel and executes the braking force simultaneous control mode to the right/left rear wheels RL, RR. In contrast, when the vehicle 11 travels at the medium/low speed, the vehicle braking control device executes the braking force independent control mode to the right/left rear wheels RL, RR. When the vehicle 11 shifts from the high speed travel to the medium/low speed travel, i.e. when a vehicle speed becomes equal to or less than a preset and predetermined vehicle speed, the vehicle braking control device switches from the braking force simultaneous control mode to the braking force independent control mode. When the slip ratio difference of the right/left rear wheels RL, RR becomes equal to or more than a predetermined slip ratio difference when the modes are switched, the ECU 41 increases a braking force of a rear wheel on slip ratio small side, whereas decreasing a braking force of a rear wheel on a slip ratio large side without changing any of all the braking forces of the right/left rear wheels RL, RR. Thereafter, when the slip ratio difference of the right/left rear wheels RL, RR becomes equal to or less than the predetermined value, the vehicle braking control device executes the braking force independent control mode.

In the vehicle braking control device of the first embodiment, a braking control mode switching process by the ECU 41 (the switching controller 53) will be explained below in detail based on the flowcharts of FIG. 2 to FIG. 5.

In the vehicle braking control device of the first embodiment, as illustrated in FIG. 2, at step S11, the ECU 41 determines whether or not the vehicle 11 is being braked. The determination is executed based on, for example, the depression amount of the brake pedal 28 detected by the brake stroke sensor 42, the depression force of the brake pedal 28 detected by the brake depression force sensor. When it is determined that the vehicle 11 is not being braked (No), the ECU 1 exits the routine without executing anything. In contrast, when it is determined at step S11 that the vehicle 11 is being braked (Yes), the ECU 1 goes to step S12.

At step S12, the ECU 41 determines whether or not a vehicle speed is higher than a preset and predetermined vehicle speed Vt. The determination is executed based on, for example, the speed of the vehicle 11 detected by the vehicle speed sensor 45. When it is determined that the vehicle speed is higher than the predetermined vehicle speed Vt (Yes), the ECU 41 executes a braking process 1 at step S13.

The braking process 1 is a process for the ECU 41 (the braking force simultaneous control mode executing unit 51) to execute the braking force simultaneous control mode to the right/left rear wheels RL, RR. Namely, in the braking force simultaneous control mode executed by the braking force simultaneous control mode executing unit 51, as illustrated in FIG. 3, at step S21, the ECU 41 determines whether or not hydraulic pressures (brake hydraulic pressures) supplied to the respective wheel cylinders 25 of the disk brake units 21RR, 21RL are being kept. When it is determined that the brake hydraulic pressures are being kept (Yes), the ECU 41 exits the routine without executing anything. In contrast, when it is determined that the brake hydraulic pressures are not being kept (No), the ECU 41 goes to step S22.

At step S22, the ECU 41 calculates slip ratios in the right/left rear wheels RL, RR and determines whether or not a maximum slip ratio is larger than a preset and predetermined slip ratio St1. The slip ratios of the right/left rear wheels RL, RR are calculated based on the wheel speeds detected by the wheel speed sensors 44 and the vehicle speed detected by the vehicle speed sensor 45. A larger slip ratio of the slip ratios of the right/left rear wheels RL, RR is used as the maximum slip ratio. When it is determined that the maximum slip ratio is equal to or less than the predetermined slip ratio St1 (No), the ECU 41 exits the routine without executing anything. In contrast, when it is determined that the maximum slip ratio is larger than the predetermined slip ratio St1 (Yes), at step S23, the ECU 41 keeps the brake hydraulic pressures of the right/left rear wheels RL, RR at the current time. As described above, the braking force simultaneous control mode, by which the brake hydraulic pressures to the right/left rear wheels RL, RR are simultaneously set, is executed.

In contrast, returning to FIG. 2, at step S12, when the ECU 41 determines that the vehicle speed is equal to or less than the predetermined vehicle speed Vt (No), at step S14, the ECU 41 determines whether or not the braking process 2 is completed. When it is determined that the braking process 2 is not completed (No), at step S15, the ECU 41 executes the braking process 2.

The braking process 2 is a process for the ECU 41 (the switching controller 53) to switch from the braking force simultaneous control mode to the braking force independent control mode to the right/left rear wheels RL, RR. Namely, in the mode switching process by the switching controller 53, as illustrated in FIG. 4, at step S31, the ECU 41 determines whether or not the hydraulic pressures (the brake hydraulic pressures) supplied to the respective wheel cylinders 25 of the disk brake units 21RR, 21RL are being kept. When it is determined that the brake hydraulic pressures are not being kept (No), the ECU 41 goes to step S32.

At step S32, the ECU 41 calculates slip ratios in the right/left rear wheels RL, RR and determines whether or not a maximum slip ratio is larger than a preset and predetermined slip ratio St2. When it is determined that the maximum slip ratio is equal to or less than the predetermined slip ratio St2 (No), the ECU 41 exits the routine without executing anything. In contrast, when it is determined that the maximum slip ratio is larger than the predetermined slip ratio St2 (Yes), at step S33, the ECU 41 keeps the brake hydraulic pressures of the right/left rear wheels RL, RR at the current time.

Further, at step S31, when it is determined that the brake hydraulic pressures are being kept (Yes), the ECU 41 goes to step S34. At step S34, the ECU 41 calculates slip ratios in the right/left rear wheels RL, RR and determines whether or not a deviation (an absolute value) of the slip ratios in the respective rear wheels RL, RR is larger than a preset and predetermined slip ratio deviation Std. When it is determined that the slip ratio deviation of the respective rear wheels RL, RR is equal to or less than the predetermined slip ratio deviation Std (No), at step S33, the ECU 41 keeps the brake hydraulic pressures of the right/left rear wheels RL, RR at the current time. In contrast, when it is determined that the slip ratio deviation of the respective rear wheels RL, RR is larger than the predetermined slip ratio deviation Std (Yes), at step S35, the ECU 41 increases a brake hydraulic pressure to a rear wheel RL, RR on a slip ratio small side of the slip ratios of the right/left rear wheels RL, RR, whereas decreasing a brake hydraulic pressure of a rear wheel RL, RR on a slip ratio large side. At the time, the respective brake hydraulic pressures to the respective rear wheels RL, RR are increased and decreased so that all the brake hydraulic pressures to the right/left rear wheels RL, RR, i.e. a total hydraulic pressure of the brake hydraulic pressure to the left rear wheel RL and the brake hydraulic pressure to the right rear wheel RR does not change.

When the braking process 2 is completed as described above, returning to FIG. 2, at step S14, the ECU 41 determines that the braking process 2 is completed (Yes) and executes a braking process 3 at step S16. The braking process 3 is a process for the ECU 41 (the braking force independent control mode executing unit 52) to execute the braking force independent control mode to the right/left rear wheels RL, RR. Namely, in the braking force independent control mode by the braking force independent control mode executing unit 52, as illustrated in FIG. 5, at step S41, the ECU 41 determines whether or not the hydraulic pressures (brake hydraulic pressures) supplied to the respective wheel cylinders 25 of the disk brake units 21RR, 21RL are being kept. When it is determined that the brake hydraulic pressures are not being kept (No), the ECU 41 goes to step S42.

At step S42, the ECU 41 calculates slip ratios in the right/left rear wheels RL, RR and determines whether or not the respective wheel slip ratios are larger than a preset and predetermined slip ratio St3. When it is determined that the respective wheel slip ratios are equal to or less than the predetermined slip ratio St3 (No), the ECU 41 exits the routine without executing anything. In contrast, When it is determined that the respective wheel slip ratios are larger than the predetermined slip ratio St3 (Yes), at step S43, the ECU 41 keeps a brake hydraulic pressure of a wheel whose slip ratio exceeds the predetermined slip ratio of the right/left rear wheels RL, RR at the current time.

In contrast, at step S41, when it is determined that the brake hydraulic pressures are being kept (Yes), the ECU 41 goes to step S44. At step S44, the ECU 41 calculates slip ratios in the right/left rear wheels RL, RR and determines whether or not the respective slip ratios are larger than a preset and predetermined slip ratio St4. When it is determined that a slip ratio of a right/left rear wheel RL, RR is larger than the predetermined slip ratio St4 (Yes), at step S45, the ECU 41 decreases a brake hydraulic pressure of the rear wheel RL, RR whose slip ratio is determined larger than the predetermined slip ratio St4.

Further, at step S44, when it is determined that the slip ratios of the right/left rear wheels RL, RR are equal to or less than the predetermined slip ratio St4 (No), the ECU 41 goes to step S46. At step S46, the ECU 41 calculate slip ratios of the right/left rear wheels RL, RR and determines whether or not the respective slip ratios are smaller than a preset and predetermined slip ratio St5. When it is determined that the slip ratios of the right/left rear wheels RL, RR are smaller than the predetermined slip ratio St5 (Yes), at step S47, the ECU 41 increase a brake hydraulic pressure of a rear wheel RL, RR whose slip ratio is determined smaller than the predetermined slip ratio St5. In contrast, when it is determined that the slip ratios are equal to or more than the predetermined slip ratio St5 (No), at step S43, the ECU 41 keeps the brake hydraulic pressures of the right/left rear wheels RL, RR at the current time. The predetermined slip ratio St4 is a slip ratio upper limit value and the predetermined slip ratio St5 is a slip ratio lower limit value. As described above, the braking force independent control mode by which the brake hydraulic pressures to the right/left rear wheels RL, RR are independently set is executed.

How a vehicle speed, a brake hydraulic pressure, and a slip ratio are changed by the switching process from the braking force simultaneous control mode to the braking force independent control mode executed by the vehicle braking control device of the first embodiment will be explained based on the time chart of FIG. 6.

In the mode switching process executed by the vehicle braking control device of the first embodiment, as illustrated in FIG. 6, when the driver depresses the brake pedal 28 and starts a braking operation, an increase of a brake hydraulic pressure P decreases the vehicle speed V, thereby increasing the slip ratio. At time t1, since one of slip ratios $S_1$, $S_2$ in the right/left rear wheels RL, RR, i.e. the slip ratio $S_1$ exceeds a predetermined slip ratio St, a braking force simultaneous control mode process F1 is executed. At the time, a brake hydraulic pressure $P_0$ is kept.

Thereafter, at time t2, when the vehicle speed V becomes equal to or less than the predetermined vehicle speed Vt, a mode switching process F2 is executed. Namely, a brake hydraulic pressure $P_1$ to the rear wheel RL, RR on the slip ratio small side ($S_2$) is increased, whereas a brake hydraulic pressure $P_2$ to the rear wheel RL, RR on the slip ratio large side ($S_1$) is decreased so that a deviation of the slip ratios $S_1$, $S_2$ in the right/left rear wheels RL, RR becomes the predetermined slip ratio deviation Std (for example, zero) At the time, the respective brake hydraulic pressures to the respective right/left rear wheels RL, RR are increased and decreased so that all the brake hydraulic pressures $P_1+P_2$ to the respective rear wheels RL, RR do not vary.

At time t3, when the deviation of the slip ratios $S_1$, $S_2$ in the right/left rear wheels RL, RR becomes zero, the mode switching process F2 is completed and a braking force independent control mode F3 is executed. At the time, the brake hydraulic pressures $P_1$, $P_2$ are kept in the respective rear wheels RL, RR and the slip ratio is controlled to a slip ratio $S_0$.

As described above, the vehicle braking control device of the first embodiment is provided with the braking force simultaneous control mode executing unit 51 capable of executing the braking force simultaneous control mode for simultaneously controlling the right/left wheel cylinders 25 by the brake hydraulic pressure circuit 27 according to the slip ratios of the right/left rear wheels RL, RR, the braking force independent control mode executing unit 52 capable of executing the braking force independent control mode for independently controlling the right/left wheel cylinders 25, and the switching controller 53 capable of switching the braking force simultaneous control mode and the braking force independent control mode, wherein, at the time of switching from the braking force simultaneous control mode to the braking force independent control mode, the switching controller 53 shifts to the braking force independent control mode when the slip ratio difference of the right/left rear wheels RL, RR becomes equal to or less than the preset and predetermined slip ratio difference.

When the slip ratio difference of the right/left rear wheels RL, RR becomes equal to or less than the predetermined slip ratio difference at the time of switching from the braking force simultaneous control mode to the braking force independent control mode, since the braking force simultaneous control mode shifts to the braking force independent control mode, a traveling stability can be improved by suppressing an occurrence of a disturbance of behavior of the vehicle 11.

In the vehicle braking control device of the first embodiment, when the slip ratio difference of the right/left rear wheels RL, RR is larger than the preset and predetermined value, the braking force of the rear wheel RL, RR on the slip ratio small side is increased, whereas the braking force of the rear wheel RL, RR on the slip ratio large side is decreased. When the slip ratio difference becomes equal to or less than the predetermined value by increasing and decreasing the braking forces of the respective rear wheels RL, RR at the time of switching from the braking force simultaneous control mode to the braking force independent control mode, since the braking force simultaneous control mode shifts to the braking force independent control mode, an occurrence of a disturbance of behavior of the vehicle 11 at the time can be suppressed.

Further, in the vehicle braking control device of the first embodiment, the braking force of the right/left rear wheel RL, RR on the slip ratio small side is increased, whereas the braking force of the rear wheel RL, RR on the slip ratio large side is decreased without changing any of all the braking forces of the right/left rear wheels RL, RR. Thus, since any of the braking forces of the right/left rear wheels RL, RR is not changed, the behavior of the vehicle 11 can be stabilized, thereby the traveling stability can be improved.

Namely, while the vehicle 11 travels at a high speed, since the braking force simultaneous control mode executing unit 51 executes a control so that the braking forces of the right/left rear wheels RL, RR become relatively small, if the switching controller 53 switches to the braking force independent control mode as soon as a vehicle speed is decreased during braking and becomes equal to or less than a predetermined value for switching the modes, both the braking forces of the right/left rear wheels RL, RR are increased. As a result, in the vehicle 11, since the braking forces of the right/left rear wheels RL, RR are increased before a sufficient braking force deviation of the right/left rear wheels RL, RR is secured in the braking force independent control mode, the traveling stability of the vehicle 11 is deteriorated.

To cope with the problem, the vehicle braking control device of the first embodiment switches to the braking force independent control mode after the slip ratio difference of the right/left rear wheels RL, RR has made equal to or less than the predetermined value by increasing the braking force of the rear wheel RL, RR on the slip ratio small side, whereas decreasing the braking force of the rear wheel RL, RR on the slip ratio large side when the speed of the vehicle 11 becomes equal to or less than the predetermined value. Since the braking force deviation in the right/left rear wheels RL, RR for securing the traveling stability of the vehicle 11 can be secured before a distribution of the respective braking forces of the right/left rear wheels RL, RR is increased in the braking force independent control mode, the modes can be switched while keeping a sufficient traveling stability of the vehicle 11.

Second Embodiment

Figure 7:
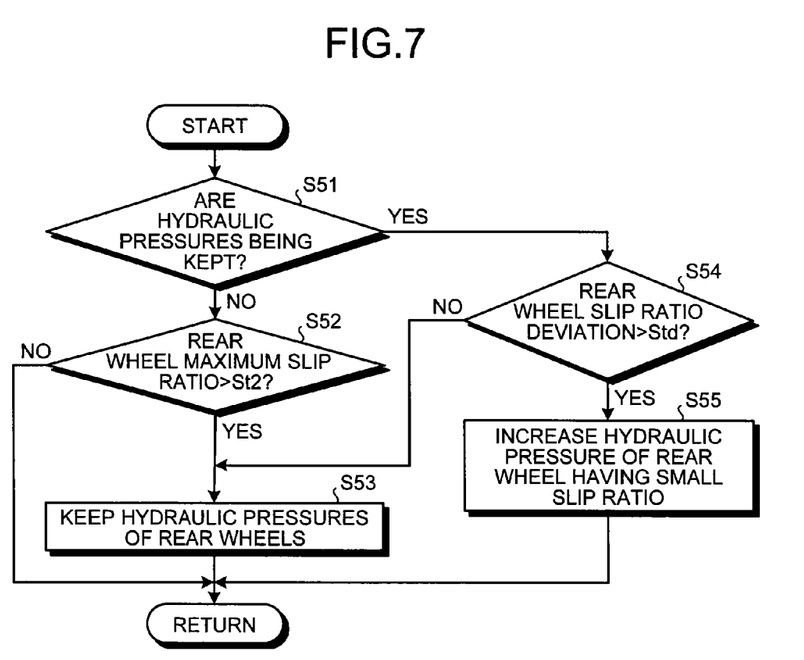
FIG. 7 is a flowchart illustrating a braking process 2 by a vehicle braking control device according to a second embodiment of the present invention.
Figure 8:
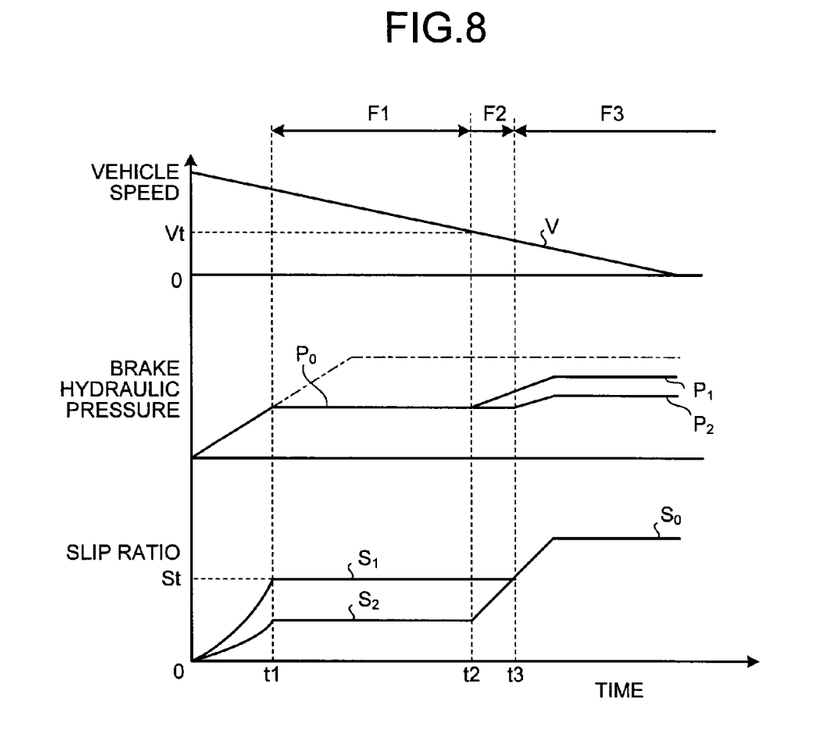
FIG. 8 is a time chart illustrating a braking process 3 by the vehicle braking control device of the second embodiment.

FIG. 7 is a flowchart illustrating a braking process 2 by a vehicle braking control device according to a second embodiment of the present invention, and FIG. 8 is a time chart illustrating a braking process 3 by the vehicle braking control device of the second embodiment. Since a basic configuration of the vehicle braking control device of the embodiment is approximately the same as the first embodiment described above, the device will be explained using FIG. 1. Components having the same functions the first embodiment are denoted by the same reference numerals and a detailed explanation thereof will be omitted.

In the vehicle braking control device of the second embodiment, as illustrated in FIG. 1, an ECU 41 (a switching controller 53) switches to a braking force independent control mode when a slip ratio difference of right/left rear wheels RL, RR becomes equal to or less than a preset and predetermined value at the time of switching from a braking force simultaneous control mode to the braking force independent control mode.

At the time, when the slip ratio difference of the right/left rear wheels RL, RR is larger than the preset and predetermined value, the ECU 41 (the switching controller 53) increases a braking force of a rear wheel on a slip ratio small side, whereas keeping a braking force of a rear wheel on a slip ratio large side.

When a vehicle 11 shifts from a high speed travel to a medium/low speed travel, i.e. when a vehicle speed becomes equal to or less than the preset and predetermined vehicle speed, the vehicle braking control device of the second embodiment switches from the braking force simultaneous control mode to the braking force independent control mode. When the modes are switched, the braking force of the rear wheel on the slip ratio small side is increased, whereas the braking force of the rear wheel on the slip ratio large side is kept until the slip ratio difference of the right/left rear wheels RL, RR becomes equal to or less than the predetermined value. Thereafter, when the slip ratio difference of the right/left rear wheels RL, RR becomes equal to or less than the predetermined value, the braking force independent control mode is executed.

A braking control mode switching process by the ECU 41 (the switching controller 53) in the vehicle braking control device of the second embodiment will be explained below in detail based on the flowchart of FIG. 7. In the vehicle braking control device of the second embodiment, since only a braking process 2 is different from the first embodiment described above and the braking control mode switching process, a braking process 1, and a braking process 3 are the same as the first embodiment, an explanation thereof will be omitted.

The braking process 2 by the vehicle braking control device of the second embodiment is a process for the ECU 41 (the switching controller 53) to switches from the braking force simultaneous control mode to the braking force independent control mode to the right/left rear wheels RL, RR. Namely, in the mode switching process by the switching controller 53, as illustrated in FIG. 7, at step S51, an ECU 41 determines whether or not hydraulic pressures (brake hydraulic pressures) supplied to respective wheel cylinders 25 of disk brake units 21RR, 21RL are being kept. When it is determined that the brake hydraulic pressures are not being kept (No), the ECU 41 goes to the step S52.

At step S52, the ECU 41 calculates slip ratios of the right/left rear wheels RL, RR and determines whether or not a maximum slip ratio is larger than a preset and predetermined slip ratio St2. When it is determined that the maximum slip ratio is equal to or less than the predetermined slip ratio St2 (No), the ECU 41 exits the routine without executing anything. In contrast, when it is determined that the maximum slip ratio is larger than the predetermined slip ratio St2 (Yes), at step S53, the brake hydraulic pressures of the right/left rear wheels RL, RR at the current time are kept.

Further, at step S51, when it is determined that the brake hydraulic pressures are being kept (Yes), the ECU 41 goes to step S54. At step S54, the ECU 41 calculates slip ratios in the right/left rear wheels RL, RR and determines whether or not a deviation (absolute value) of the slip ratios of the respective rear wheels RL, RR is larger than a preset and predetermined slip ratio deviation Std. When it is determined that the slip ratio deviation of the respective rear wheels RL, RR is equal to or less than the predetermined slip ratio deviation Std (No), at step S53, the ECU 41 keeps the brake hydraulic pressures of the right/left rear wheels RL, RR at the current time. In contrast, when it is determined that the slip ratio deviation of the respective rear wheels RL, RR is larger than the predetermined slip ratio deviation Std (Yes), at step S55, the ECU 41 increases the brake hydraulic pressure to the rear wheel RL, RR on the slip ratio small side of the slip ratios of the right/left rear wheels RL, RR. At the time, the ECU 41 keeps the brake hydraulic pressure to the rear wheel RL, RR on the slip ratio large side of the slip ratios of the right/left rear wheels RL, RR without changing it.

Namely, when the braking force independent control mode is executed after the mode switching process is completed, the brake hydraulic pressures of the right/left rear wheels RL, RR are increased. That is, since the brake hydraulic pressure to the rear wheel RL, RR on the slip ratio large side is increased after it is decreased, there is a fear that operation noise becomes large by an increase of the number of times of operation of an electromagnetic valve for switching the braking hydraulic pressures. Thus, in the case, only the brake hydraulic pressure to the rear wheel RL, RR on the slip ratio small side of the slip ratios of the right/left rear wheels RL, RR is increased and the brake hydraulic pressure to the rear wheel RL, RR on the slip ratio large side is kept as it is.

When the braking process 2 is completed, the braking process 3, i.e. the ECU 41 (the braking force independent control mode executing unit 52) executes the braking force independent control mode to the right/left rear wheels RL, RR.

How a vehicle speed, a brake hydraulic pressure, and a slip ratio are changed by the switching process from the braking force simultaneous control mode to the braking force independent control mode by the vehicle braking control device of the second embodiment will be explained based on the time chart of FIG. 8.

In the mode switching process by the vehicle braking control device of the second embodiment, as illustrated in FIG. 8, when a driver depresses a brake pedal 28 and starts a braking operation, an increase of a brake hydraulic pressure P decreases a vehicle speed V, thereby increasing the slip ratio. At time t1, since one of slip ratios $S_1$, $S_2$ in the right/left rear wheels RL, RR, i.e. the slip ratio $S_1$ exceeds a predetermined slip ratio St, a braking force simultaneous control mode process F1 is executed. At the time, a brake hydraulic pressure $P_0$ is kept.

Thereafter, at time t2, when the vehicle speed V becomes equal to or less than a predetermined vehicle speed Vt, a mode switching process F2 is executed. Namely, a brake hydraulic pressure $P_1$ to the rear wheels RL, RR on a slip ratio small side ($S_2$) is increased, whereas a brake hydraulic pressure $P_2$ to the rear wheel RL, RR on a slip ratio large side ($S_1$) is kept so that a deviation of slip ratios $S_1$, $S_2$ of the right/left rear wheels RL, RR becomes the predetermined slip ratio deviation Std (for example, zero).

At time t3, when the deviation of the slip ratios $S_1$, $S_2$ in the right/left rear wheels RL, RR becomes zero, the mode switching process F2 is completed and a braking force independent control mode F3 is executed. At the time, the brake hydraulic pressures $P_1$, $P_2$ are kept to the respective rear wheels RL, RR and the slip ratio is controlled to a slip ratio $S_0$.

As described above, in the vehicle braking control device of the second embodiment, when the slip ratio difference of the right/left rear wheels RL, RR is larger than the preset and predetermined value at the time of switching from the braking force simultaneous control mode to the braking force independent control mode, the switching controller 53 increases the braking force of the rear wheel RL, RR on the slip ratio small side, whereas holding the braking force of the rear wheel RL, RR on the slip ratio large side.

When the braking force of the rear wheel RL, RR on the slip ratio small side is increased and the slip ratio difference becomes equal to or less than the predetermined value at the time of switching from the braking force simultaneous control mode to the braking force independent control mode, shifting to the braking force independent control mode can suppress an occurrence of a disturbance of behavior of the vehicle 11 at the time. Further, keeping the braking force of the rear wheel RL, RR on the slip ratio large side can improve a damping property by decreasing the number of times of operation of the electromagnetic valve for switching the braking hydraulic pressures and suppressing the operation noise from becoming large.

Third Embodiment

Figure 9:
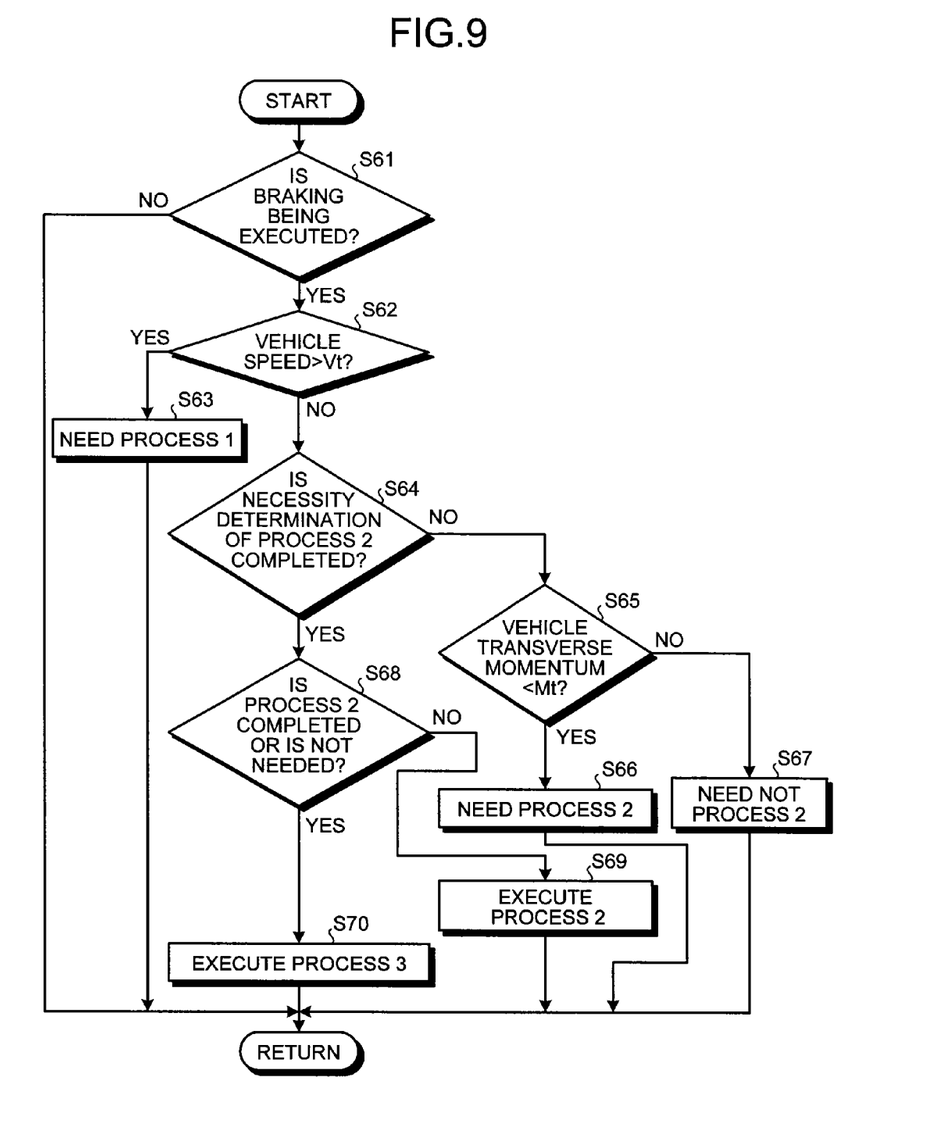
FIG. 9 is a flowchart illustrating a mode switching process of a braking control in a vehicle braking control device according to a third embodiment.

FIG. 9 is a flowchart illustrating a mode switching process of a braking control in a vehicle braking control device according to a third embodiment. Since a basic configuration of the vehicle braking control device of the embodiment is approximately the same as the first embodiment described above, the device will be explained using FIG. 1. Components having the same functions as the first embodiment are denoted by the same reference numerals and a detailed explanation thereof will be omitted.

In the vehicle braking control device of the third embodiment, as illustrated in FIG. 1, an ECU 41 (a switching controller 53) switches to a braking force independent control mode when a slip ratio difference of right/left rear wheels RL, RR becomes equal to or less than a preset and predetermined value at the time of switching from a braking force simultaneous control mode to the braking force independent control mode.

At the time, when a transverse momentum of a vehicle 11 is equal to or more than a preset and predetermined value, the ECU 41 (the switching controller 53) executes a determination of a slip ratio difference of the right/left rear wheels RL, RR.

When the vehicle 11 shifts from a high speed travel to a medium/low speed travel, i.e. when a vehicle speed becomes equal to or less than a preset and predetermined vehicle speed, the vehicle braking control device of the third embodiment switches from the braking force simultaneous control mode to the braking force independent control mode. At the time of switching of the modes, when the transverse momentum of the vehicle 11 is small, the vehicle braking control device changes or keeps braking forces of the right/left rear wheels RL, RR until the slip ratio difference of the right/left rear wheels RL, RR becomes equal to or less than a predetermined value, and when the slip ratio difference of the right/left rear wheels RL, RR becomes equal to or less than the predetermined value, the device executes the braking force independent control mode. In contrast, at the time of switching of the modes, when the transverse momentum of the vehicle 11 is large, the device executes the braking force independent control mode without determining the slip ratio difference of the right/left rear wheels RL, RR, that is, without changing the braking forces of the right/left rear wheels RL, RR.

In the case, the ECU 41 is connected with an acceleration sensor 46 that detects a lateral acceleration as the transverse momentum of the vehicle 11. The acceleration sensor 46 detects the lateral acceleration of a vehicle body and transmits the detected lateral acceleration to the ECU 41. The transverse momentum of the vehicle 11 is not limited to the lateral acceleration and, for example, a lateral speed, a roll angle, a wheel speed difference of the right/left rear wheels RL, RR, and the like may be used.

In the vehicle braking control device of the third embodiment, a braking control mode switching process by the ECU 41 will be explained below in detail based on the flowchart of FIG. 9. In the vehicle braking control device of the third embodiment, since only the braking control mode switching process is different from the first embodiment described above and a braking process 1, a braking process 2, and a braking process 3 are the same as the first embodiment or the second embodiment, an explanation thereof will be omitted.

In the vehicle braking control device of the third embodiment, as illustrated in FIG. 9, at step S61, the ECU 41 determines whether or not the vehicle 11 is being braked. When it is determined that the vehicle 11 is not being braked (No), the ECU 41 exits the routine without executing anything. In contrast, at step S61, when it is determined that the vehicle 11 is being braked (Yes), the ECU 41 goes to step S62. At step S62, the ECU 41 determines whether or not the vehicle speed is higher than a preset and predetermined vehicle speed Vt. When it is determined that the vehicle speed is higher than the predetermined vehicle speed Vt (Yes), at step S63, the ECU 41 executes the braking process 1, i.e. the braking force simultaneous control mode to the right/left rear wheels RL, RR.

In contrast, at step S62, when it is determined that the vehicle speed is equal to or less than the predetermined vehicle speed Vt (No), at step S64, the ECU 41 determines that necessity determination whether or not the braking process 2 needs to be executed is completed. When it is determined that the necessity determination whether or not the braking process 2 needs to be executed is not completed (No), the ECU 41 goes to step S65. At step S65, the ECU 41 determines whether or not the transverse momentum (lateral acceleration) of the vehicle 11 at the current time is smaller than a preset and predetermined lateral acceleration Mt. When it is determined that the lateral acceleration of the vehicle 11 at the current time is smaller than the predetermined lateral acceleration Mt (Yes), at step S66, the ECU 41 determines that the braking process 2 needs to be executed, whereas when it is determined that the lateral acceleration of the vehicle 11 at the current time is equal to or more than the predetermined lateral acceleration Mt (No), at step S67, the ECU 41 determines that the braking process 2 needs not to be executed.

At step S64, when it is determined that the necessity determination whether or not the braking process 2 needs to be executed is completed (Yes), at step S68, the ECU 41 determines whether or not the braking process 2 is completed or needs not to be executed. When it is determined that the braking process 2 is not completed or is necessary (No), at step S69, the ECU 41 executes the braking process 2, i.e. a braking force control mode switching process to the right/left rear wheels RL, RR. In contrast, When it is determined that that the braking process 2 is completed or needs not to be executed (Yes), at step S70, the ECU 41 executes the braking process 3, i.e. the braking force independent control mode to the right/left rear wheels RL, RR.

As described above, in the vehicle braking control device of the third embodiment, when the transverse momentum (the lateral acceleration) of the vehicle 11 is equal to or more than the preset and predetermined value at the time of switching from the braking force simultaneous control mode to the braking force independent control mode, the switching controller 53 switches to the braking force independent control mode without executing the braking force control mode switching process to the right/left rear wheels RL, RR.

Thus, when the transverse momentum (lateral acceleration) of the vehicle 11 is small at the time of switching from the braking force simultaneous control mode to the braking force independent control mode, the ECU 41 executes the braking force independent control mode after a braking force is adjusted so that the slip ratio difference of the right/left rear wheels RL, RR is decreased, whereas when the transverse momentum (the lateral acceleration) of the vehicle 11 is large, the ECU 41 switches to the braking force independent control mode without executing the mode switching process. Thus, when the transverse momentum of the vehicle 11 is small, a traveling stability can be improved by suppressing an occurrence of a disturbance of behavior of the vehicle 11 at the time of switching of the modes, whereas when the transverse momentum of the vehicle 11 is large, the traveling stability of the vehicle 11 can be secured and a safety can be improved by promptly decreasing the transverse momentum by executing the braking force independent control mode at an early stage.

In embodiments described above, although the explanation has been made as to the right/left rear wheels RL, RR in the vehicle 11, the explanation may be applied to the right/left front wheels FL, FR.

REFERENCE SIGNS LIST 11 vehicle
21*fr*, 21*fl*, 21*rr*, 21*rl* disk brake unit (actuator)
22 brake device
25 wheel cylinder (actuator)
27 brake hydraulic pressure circuit
28 brake pedal
41 electronic control unit (ECU)
42 brake stroke sensor
44 wheel speed sensor
45 vehicle speed sensor
46 acceleration sensor
51 braking force simultaneous control mode executing unit
52 braking force independent control mode executing unit
53 switching controller
FL, FR, RL, RR wheel

The invention claimed is:
1. A vehicle braking control device comprising:
right/left actuators configured to apply braking forces to right/left wheels;
a braking force simultaneous control mode executing unit capable of executing a braking force simultaneous control mode for simultaneously controlling the right/left actuators according to states of the right/left wheels;
a braking force independent control mode executing unit capable of executing a braking force independent control mode for independently controlling the right/left actuators according to states of the right/left wheels; and
a switching controller capable of switching the braking force simultaneous control mode and the braking force independent control mode, wherein
at the time a right/left wheel slip ratio difference becomes equal to or less than a preset and predetermined slip ratio difference during switching from the braking force simultaneous control mode to the braking force independent control mode, the switching controller shifts to the braking force independent control mode.

2. The vehicle braking control device according to claim 1, wherein
at the time the right/left wheel slip ratio difference is larger than the preset and predetermined slip ratio difference, the switching controller increases a braking force of a wheel on a slip ratio small side, whereas decreasing a braking force of a wheel on a slip ratio large side.

3. The vehicle braking control device according to claim 2, wherein
the switching controller increases the braking force of the wheel on the slip ratio small side, whereas decreasing the braking force of the wheel on the slip ratio large side without changing any of all the braking forces of the right/left wheels.

4. The vehicle braking control device according to claim 1, wherein
at the time the right/left wheel slip ratio difference is larger than the preset and predetermined slip ratio difference, the switching controller increases the braking force of a wheel on a slip ratio small side, whereas keeping the braking force of a wheel on a slip ratio large side.

5. The vehicle braking control device according to claim 1, wherein
at the time a transverse momentum of a vehicle is equal to or more than a preset and predetermined transverse momentum, the switching controller switches to the braking force independent control mode without executing a determination of the right/left wheel slip ratio difference.

6. The vehicle braking control device according to claim 2, wherein
at the time a transverse momentum of a vehicle is equal to or more than a preset and predetermined transverse momentum, the switching controller switches to the braking force independent control mode without executing a determination of the right/left wheel slip ratio difference.

7. The vehicle braking control device according to claim 3, wherein
at the time a transverse momentum of a vehicle is equal to or more than a preset and predetermined transverse momentum, the switching controller switches to the braking force independent control mode without executing a determination of the right/left wheel slip ratio difference.

8. The vehicle braking control device according to claim 4, wherein
at the time a transverse momentum of a vehicle is equal to or more than a preset and predetermined transverse momentum, the switching controller switches to the braking force independent control mode without executing a determination of the right/left wheel slip ratio difference.

9. The vehicle braking control device according to claim 1, wherein
at the time a speed of the vehicle becomes equal to or less than a preset and predetermined speed, the switching controller switches from the braking force simultaneous control mode to the braking force independent control mode.

10. The vehicle braking control device according to claim 2, wherein
at the time a speed of the vehicle becomes equal to or less than a preset and predetermined speed, the switching controller switches from the braking force simultaneous control mode to the braking force independent control mode.

11. The vehicle braking control device according to claim 3, wherein
at the time a speed of the vehicle becomes equal to or less than a preset and predetermined speed, the switching controller switches from the braking force simultaneous control mode to the braking force independent control mode.

12. The vehicle braking control device according to claim 4, wherein
at the time a speed of the vehicle becomes equal to or less than a preset and predetermined speed, the switching controller switches from the braking force simultaneous control mode to the braking force independent control mode.

13. The vehicle braking control device according to claim 5, wherein
at the time a speed of the vehicle becomes equal to or less than a preset and predetermined speed, the switching controller switches from the braking force simultaneous control mode to the braking force independent control mode.

14. A vehicle braking control device comprising:
right/left actuators configured to apply braking forces to right/left wheels;
a right/left equal braking force control mode executing unit capable of executing a right/left equal braking force control mode for controlling the right/left actuators so that braking forces of the right/left wheels becomes the same braking force;
a right/left equal slip ratio control mode executing unit capable of executing a right/left equal slip ratio control mode for controlling the right/left actuators so that slip ratios of the right/left wheels become the same slip ratio; and
a switching controller capable of switching the right/left equal braking force control mode and the right/left equal slip ratio control mode, wherein
at the time a right/left wheel slip ratio difference becomes equal to or less than a preset and predetermined slip ratio difference during switching from the right/left equal braking force control mode to the right/left equal slip ratio control mode, the switching controller shifts to the right/left equal slip ratio control mode.

* * * * *